United States Patent [19]

Mansour

[11] Patent Number: 4,929,846
[45] Date of Patent: May 29, 1990

[54] SURFACE QUALITY ANALYZER APPARATUS AND METHOD

[75] Inventor: Tahir M. Mansour, Livonia, Mich.

[73] Assignee: Ford Motor Company, Dearborn, Mich.

[21] Appl. No.: 253,453

[22] Filed: Oct. 5, 1988

[51] Int. Cl.$^5$ .............................................. G01N 21/86
[52] U.S. Cl. ...................................... 250/571; 356/371
[58] Field of Search ............... 250/560, 561, 562, 571, 250/572; 356/376, 384, 385, 237, 371, 430, 431, 445, 448

[56] References Cited

U.S. PATENT DOCUMENTS 3,922,093 11/1975 Dandliker et al. .
4,188,544 2/1980 Chasson .
4,853,777 8/1989 Hupp .................................. 358/107

Primary Examiner—David C. Nelms
Attorney, Agent, or Firm—Paul K. Godwin, Jr.; Clifford L. Sadler

[57] ABSTRACT

Method and apparatus for measuring the quality of a finished surface by projecting a pair of parallel light beams onto the surface and reflecting the beams onto an image screen where they are electronically recorded and analyzed.

36 Claims, 2 Drawing Sheets

SURFACE QUALITY ANALYZER APPARATUS AND METHOD

BACKGROUND OF THE INVENTION

1. Field of the Invention

The present invention is directed to the field of analyzing the reflective quality of surfaces and more specifically to the area of apparatus and method used to inspect and determine the quality of surfaces.

2. Background Information

In the automotive and appliance industry where painted surfaces of products need to be inspected, the conventional method used is to pass the product through an area of high intensity light emitted from banks of elongated fluorescent tubes. Human inspectors visually scan the product and look for appearance attributes and flaws such as roughness, gloss, orange peel, waviness, dents and others that contribute to a degraded measure of quality in surface appearance. The inspectors are then able to provide a relative rating of the overall surface quality of each inspected product, based upon their subjective evaluation. While the aforementioned subjective technique may be used by an experienced inspector with some measure of reliability and consistency, it is subject to wide variations between different inspectors, and does not lend itself to high speed applications. Automation techniques are desired to Provide a quantitative, rapid and more consistent measure of quality. The high speed and distinctive repeatability are desired to provide a basis for statistical analysis and correction of quality degradation.

SUMMARY OF THE INVENTION

The present invention utilizes a laser-based optical projection apparatus to produce a profile image of a test surface that is being evaluated. The profile image has been found to contain readily discernable representations of physical features on a surface which are relevant to its appearance quality. The apparatus generates a pair of light beams that are directed toward the test surface and are parallelly incident thereto. The incident light is both dispersed and reflected from the test surface. The reflected light impinges upon a light dispersing screen where it is imaged by a video camera and electronically processed. The images appearing on the screen constitute profiles of the test surface and, by comparing variations in the line images, the distance between the images, thickness of the line images, curvatures and other comparative features, the electronics attached to the video camera is able to detect and identify those features. The identified features are then analyzed by an appropriately weighted algorithm to produce a numerical index which is configured to correlate with a human inspection expert's visual assessment of the overall surface quality, having been previously calibrated.

It is an object of the present invention to provide an apparatus and method for projecting a pair of light beams onto a test surface and imaging the reflected beams for quality analysis.

It is a further object of the present invention to provide a projection apparatus and method in which a pair of diverging light beams are directed to a test surface in a parallel arrangement and are imaged onto a light dispersing screen for comparison through electronic means.

It is a further object of the present invention to provide a projection apparatus and method in which a pair of diverging light beams are directed to a test surface in a parallel arrangement and imaged onto a dispersing screen. The images are recorded and analyzed to give a measure of the quality of the test surface with reference against predetermined levels of quality.

DETAILED DESCRIPTION OF THE PREFERRED EMBODIMENT

Figure 1:
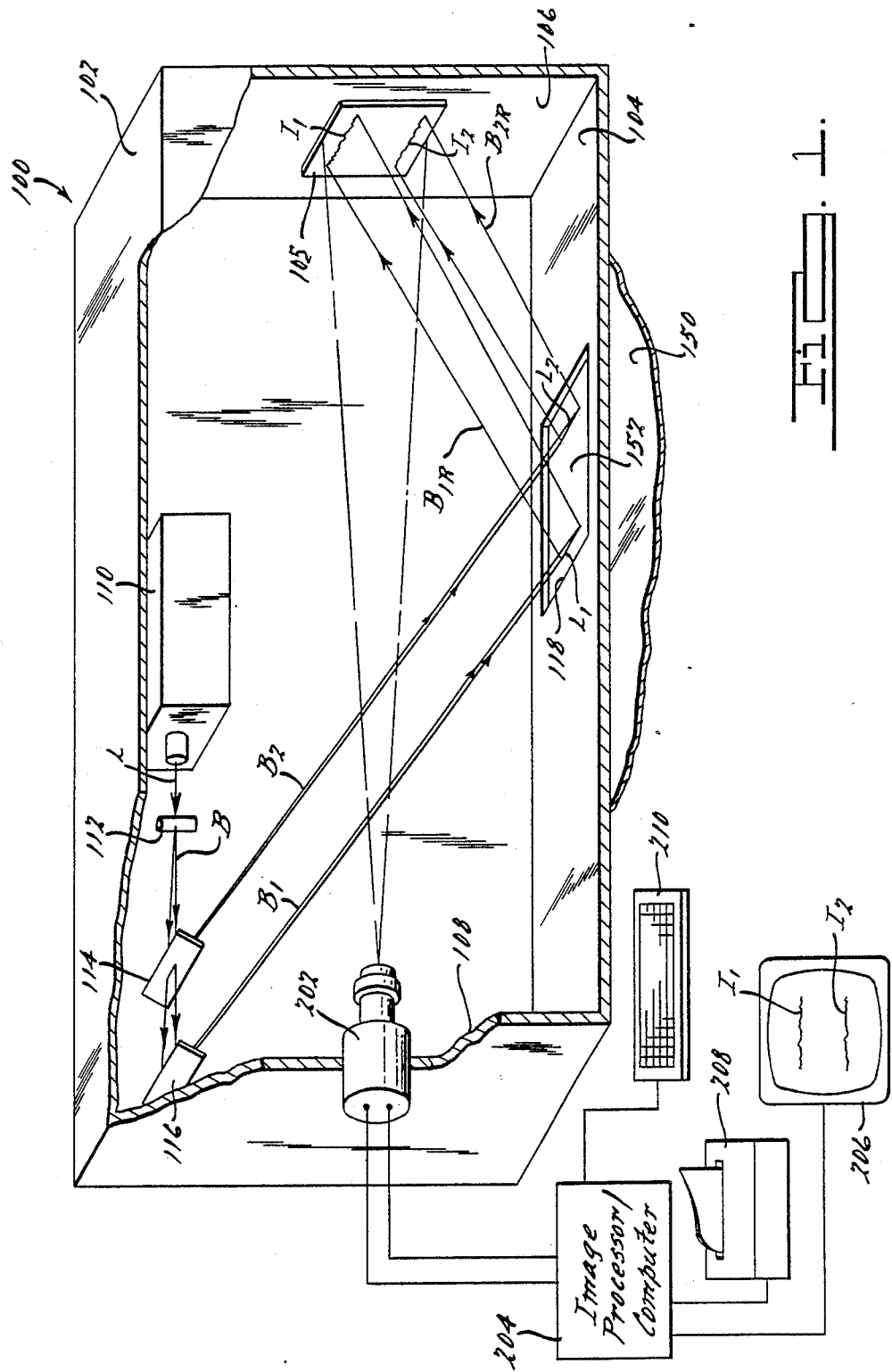
FIG. 1 is a perspective cutaway view of the housing which contains the components of the preferred embodiment of the invention.

The embodiment of the invention shown in FIG. 1 includes a substantially light-tight housing 100 shown in a partial cutaway view. Housing 100 includes a top 102, a bottom 104 and end panels 106 and 108. The bottom 104 includes a rectangular aperture 118 through which projected lines of light $L_1$ and $L_2$ are projected onto an area 152 of a test surface 150 underlying the housing 100.

A laser 110 is enclosed within the housing 100 and generates a collimated monochromatic pencil beam L. The pencil beam L impinges on a cylindrical lens 112 where it is caused to be diverged in a single plane as a fan beam B. A partially reflecting planar mirror 114 serves to transmit a portion of the beam B and reflect the remainder towards the opening 118.

A second planar mirror 116 is located in line with the portion of beam B transmitted through partially reflecting mirror 114. The planar mirror 116 is angled substantially the same as planar mirror 114 so that it reflects a diverging beam $B_1$ in a plane parallel to $B_2$. Beams $B_1$ and $B_2$ are both directed to the area defined by the open aperture 118 in the base of the housing 104 and impinge upon an area 152 of the test surface 150. Beams $B_1$ and $B_2$ are projected onto the surface 152 as line beams $L_1$ and $L_2$ at an acute angle of incidence that is preferably greater than 45°. The light is reflected from the test surface 152 as $B_{1R}$ and $B_{2R}$ and is imaged onto a screen 105 as respective images $I_1$ and $I_2$. Depending upon the unevenness, the dispersing characteristics, the curvature and other properties of the test surface effecting the light, the respective images $I_1$ and $I_2$ will vary.

The screen 105 on wall 106 is preferably a white planar surface that has light dispersion characteristics and is generally nonabsorbent of the light energy. A video camera 202 is mounted in wall 108 directly across from wall 106 and contains a lens which is focused upon the screen 105 in order that it may record the images $I_1$ and $I_2$ appearing on the screen 105. The output of the video camera 202 is connected to an image processor/computer 204 that contains peripherals such as a video monitor 206, a printer 208 and a keyboard 210.

In operation, the more closely the properties of the surface area 152 of the test sample 150 are to a planar mirror, the images $I_1$ and $I_2$ will appear on the screen 105 with a predetermined separation and approximate two line images without significant width. However, as dispersion characteristics are present in the the surface 152, those characteristics will result in the images $I_1$ and $I_2$ appearing as thicker lines. Dents or curvatures in the test surface 152 will affect the shapes and spacing of the images $I_1$ and $I_2$. (Separate and distinguishable intensity levels for beams $B_1$ and $B_2$ may be provided in order to correspondingly distinguish images $I_1$ and $I_2$ with respect to each other.) In essence, the images $I_1$ and $I_2$ are profiles of the surface 152 and the variations in the images $I_1$ and $I_2$ from straight lines are detectable and measurable.

The image processor/computer 204 is programmed utilizing various test samples having known reflective properties inspected with the projector apparatus and compared with the subjective ratings of a human expert utilizing conventional techniques. Utilizing appropriate algorithms, and samplings at different areas of the surface 150, an overall quality measure can be obtained in a printed form through the printer 208 with a rating that will correspond to that provided by a human expert.

Figure 2:
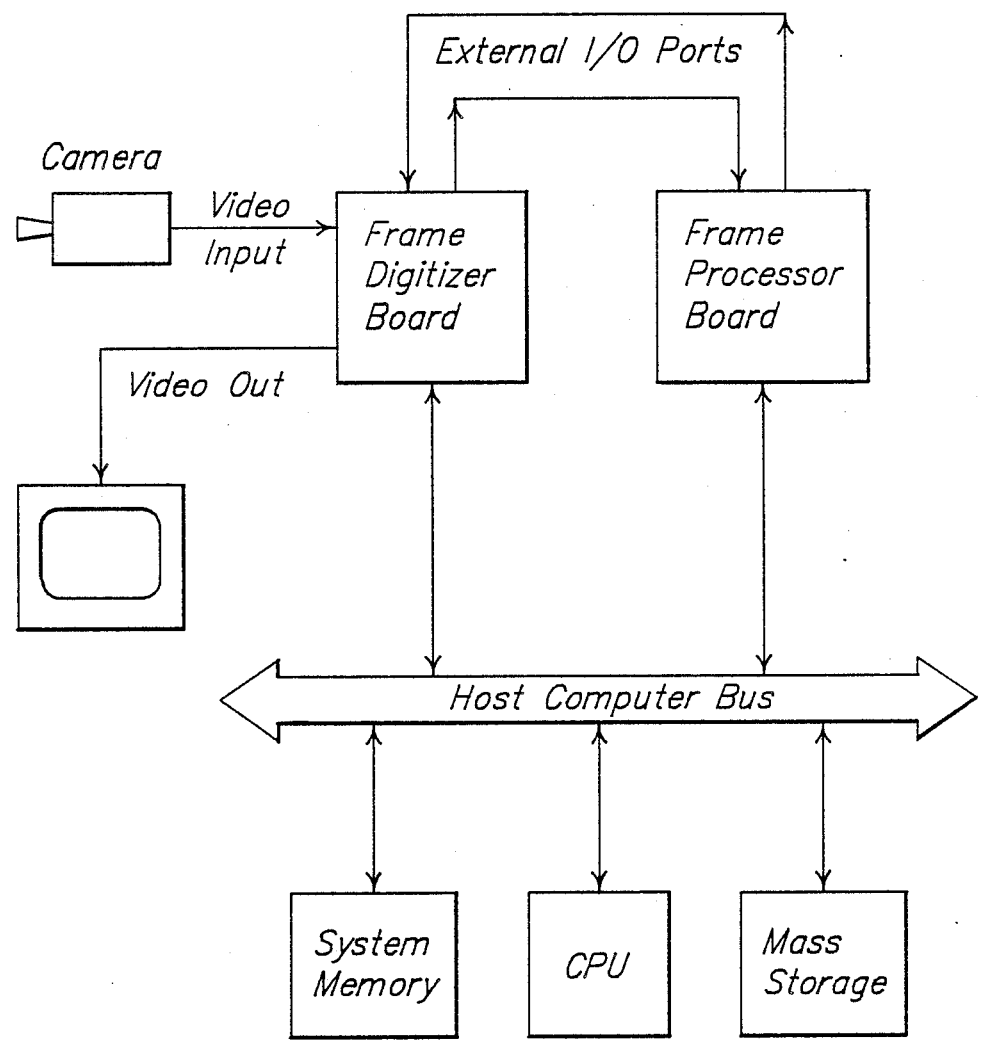
FIG. 2 is a block diagram of the image processing portion of the invention.

As indicated in FIGS. 1 and 2, the image that is electrically recorded by the video camera is provided to the image processor/computer 204. A Frame Digitizer Board converts the analog video to a digital signal. The digitized image is provided to a Frame Processor Board where filtering and enhancement eliminates noise. The computer section is programmed with appropriate algorithms to analyze the filtered and enhanced images and, in view of previous analysis made by a human inspection expert, provides a quality measure to the operator.

It will be apparent that many modifications and variations may be implemented without departing from the scope of the novel concept of this invention. Therefore, it is intended by the appended claims to cover all such modifications and variations which fall within the true spirit and scope of the invention.

I claim:

1. An apparatus for simultaneously projecting a pair of light beams onto a test surface and imaging the reflected beams or quality analysis, comprising means for generating a collimated beam of monochromatic light energy;

means for diverging said collimated beam in a single plane, splitting said diverging beam into at least one pair of beams and directing said beams towards said test surface;

means providing a housing for mounting said generating means and said diverging, splitting and directing means in a predetermined orientation and including an opening through which said beams can impinge upon a test surface located adjacent said housing;

screen means located within said housing for imaging the monochromatic light reflected from said test surface; and means for recording the images on said screen means and analyzing the recorded images to categorize the quality of the test surface against predetermined levels of quality.

2. An apparatus as in claim 1, wherein said generating means is a laser.

3. An apparatus as in claim 2, wherein said diverging, splitting and directing means includes a cylindrical lens located in the path of said beam from said laser, a partially reflective mirror to reflect a first portion and to transmit a second portion of said diverging beam from said cylindrical lens, and a reflective mirror to reflect said second portion of said diverging beam transmitted by said partially reflective mirror in a plane substantially parallel said first portion reflected by said partially reflective mirror.

4. An apparatus as in claim 3, wherein said diverging beams are of distinguishably different intensity levels.

5. An apparatus as in claim 3, wherein said diverging beams in said parallel planes are each incident on said test surface at an acute angle as parallel lines of light energy.

6. An apparatus as in claim 5, wherein said screen means is an opaque planar surface having light dispersion characteristics and being substantially nonabsorbent of the light energy.

7. An apparatus as in claim 5, wherein said parallel lines of light energy are of different and distinguishable levels.

8. An apparatus for simultaneously projecting a pair of light beams onto a test surface and imaging the reflected beams for quality analysis, comprising:

means defining a substantially light-tight housing with a single opening for placement onto a test surface;

means within said housing for directing a pair of monochromatic light beams in parallel lines through said opening to be incident on said test surface;

dispersion means within said housing for providing an image of the monochromatic light beams reflected from said test surface; and means for converting said images present on said dispersion means to electronic signals suitable for comparison in an associated analyzer.

9. An apparatus as in claim 8, wherein said beams are directed through said opening in parallel planes each incident on said test surface at an acute angle as parallel lines of light energy.

10. An apparatus as in claim 9, wherein said parallel lines of light energy are of different and distinguishable levels.

11. An apparatus as in claim 9, wherein said dispersion means is an opaque planar surface having light dispersion characteristics and being substantially nonabsorbent of the light energy.

12. An apparatus as in claim 11, wherein said converting means comprises a video camera mounted on said housing and focused on said dispersion means.

13. An apparatus for projecting a pair of parallel line light beams onto a coated test surface and imaging the reflected beams for quality analysis, comprising:

means defining a substantially light-tight housing with a single opening for placement onto a coated test surface;

means within said housing for directing a pair of monochromatic light beams along parallel planes through said opening to be incident as a pair of parallel line light beams on said coated test surface;

dispersion means within said housing for providing an image of the monochromatic light beams reflected from said coated test surface; and means for converting said images present on said dispersion means to electronic signals suitable for comparison in an associated analyzer.

14. An apparatus as in claim 10, wherein said test surface is coated with a layer of material that may have varying dispersion properties that affect the images reflected therefrom.

15. An apparatus as in claim 14, wherein said beams are directed through said opening in parallel planes each incident on said test surface at an acute angle, as parallel lines of light energy.

16. An apparatus as in claim 15, wherein said screen means is an opaque planar surface having light dispersion characteristics and being substantially nonabsorbent of the light energy.

17. An apparatus as in claim 16, wherein said converting means comprises a video camera mounted on said housing and focused on said dispersion means.

18. An apparatus as in claim 15, wherein said parallel lines of light energy are of different and distinguishable levels.

19. A method of simultaneously projecting a pair of light beams onto a test surface and imaging the reflected beams for quality analysis, comprising the steps:
generating a collimated beam of monochromatic light energy;
diverging said collimated beam in a single plane, splitting said diverging beam into at least one pair of beams and directing said beams towards said test surface;
providing a test surface in the path of said pair of beams;
imaging the monochromatic light reflected from said test surface onto a screen; and
recording the images on said screen and analyzing the recorded images to categorize the quality of the test surface against predetermined levels of quality.

20. A method as in claim 19, wherein said collimated beam of monochromatic light energy is generated by a laser.

21. A method as in claim 20, wherein said steps of diverging, splitting and directing includes the use of a cylindrical lens located in the path of said beam from said laser, a partially reflective mirror to reflect a first portion and to transmit a second portion of said diverging beam from said cylindrical lens, and a fully reflective mirror to reflect said second portion of said diverging beam transmitted by said partially reflective mirror in a plane substantially parallel said first portion reflected by said partially reflective mirror.

22. A method as in claim 21, wherein said pair of light beams are of distinguishably different intensity levels.

23. A method as in claim 21, wherein said diverging beams in said parallel planes are each incident on said test surface at an acute angle, as parallel lines of light energy.

24. A method as in claim 23, wherein said screen is provided as an opaque planar surface having light dispersion characteristics substantially nonabsorbent of the light energy.

25. A method as in claim 23, wherein said parallel lines of light energy are of different and distinguishable levels.

26. A method of projecting a pair of light beams onto a test surface and imaging the reflected beams for quality analysis, comprising the following steps of:
defining a substantially light-tight housing with a single opening for placement onto a test surface;
within said housing, directing a pair of monochromatic light beams in parallel lines through said opening to be incident on said test surface;
providing an image of the monochromatic light beams reflected from said test surface; and
converting said images to electronic signals suitable for comparison in an associated analyzer.

27. A method as in claim 26, wherein said beams are directed through said opening in parallel planes each incident on said test surface at an acute angle, as parallel lines of light energy.

28. A method as in claim 27, wherein said parallel lines of light energy are of different and distinguishable levels.

29. A method as in claim 27, wherein said image is protected by placing a screen having an opaque planar surface with light dispersion characteristics and being substantially nonabsorbent of the light energy in the path of light beams reflected from said test surface.

30. A method as in claim 29, wherein a video camera is mounted on said housing and focused on said dispersion means to convert said images to said electronic signals.

31. A method of projecting a pair of parallel line light beams onto a coated test surface and imaging the reflected beams for quality analysis, comprising the steps of:
defining a substantially light-tight housing with a single opening for placement onto a coated test surface;
directing a pair of monochromatic light beams within said housing along parallel planes through said opening to be incident as a pair of parallel line light beams on said coated test surface;
providing an image within said housing of the monochromatic light beams reflected from said coated test surface; and
converting said images present on said dispersion means to electronic signals suitable for comparison in an associated analyzer.

32. A method as in claim 31, wherein said test surface is coated with a layer of material that may have varying dispersion properties that affect the images reflected therefrom.

33. A method as in claim 32, wherein said beams are directed through said opening in parallel planes each incident on said test surface at an acute angle, as parallel lines of light energy.

34. A method as in claim 33, wherein said image is provided by a screen which is an opaque planar surface having light dispersion characteristics and being substantially nonabsorbent of the light energy.

35. A method as in claim 34, wherein said step of converting utilizes a video camera mounted on said housing and focused on said dispersion means.

36. A method as in claim 33, wherein said parallel lines of light energy are of different and distinguishable levels.

* * * * *